United States Patent [19]

Skowronski et al.

[11] Patent Number: 5,535,960

[45] Date of Patent: Jul. 16, 1996

[54] CORD REEL ASSEMBLY

[75] Inventors: Richard E. Skowronski, Elk Grove Village; Gary S. Feutz, Roselle; William E. Hogg, Warrenville; Paul C. Burke, Lake Forest, all of Ill.

[73] Assignee: GTE Airfone Incorporated, Oak Brook, Ill.

[21] Appl. No.: 298,192

[22] Filed: Aug. 31, 1994

[51] Int. Cl.$^6$ ................................... B65H 75/48
[52] U.S. Cl. ................... 242/378.4; 191/12.2 R
[58] Field of Search ............... 242/378, 378.4, 242/388, 388.1, 388.5; 191/12.2 R, 12.4

[56] References Cited

U.S. PATENT DOCUMENTS

| | | |
|---|---|---|
| 2,821,453 | 1/1958 | Jessen . |
| 2,821,579 | 1/1958 | Benjamin . |
| 2,937,396 | 5/1960 | Momberg et al. . |
| 3,617,659 | 11/1971 | Freeman . |
| 3,657,491 | 4/1972 | Ryder et al. ............... 191/12.2 R |
| 3,705,962 | 12/1972 | Banister . |
| 3,773,987 | 11/1973 | Davis et al. . |
| 3,782,654 | 1/1974 | Kasa ............... 191/12.2 R |
| 3,812,307 | 5/1974 | Wagner et al. . |
| 3,858,011 | 12/1974 | Salvin et al. ............... 191/12.2 R |
| 3,929,210 | 12/1975 | Cutler . |
| 4,008,791 | 2/1977 | Shafii et al. . |
| 4,141,438 | 2/1979 | Diem . |
| 4,384,688 | 5/1983 | Smith . |
| 4,485,278 | 11/1984 | Schaller . |
| 4,499,341 | 2/1985 | Boyd . |
| 4,746,766 | 5/1988 | Soulard . |
| 4,757,955 | 7/1988 | Simmons . |
| 4,989,805 | 2/1991 | Burke . |
| 5,008,487 | 4/1991 | Shimmyo . |
| 5,094,396 | 3/1992 | Burke . |
| 5,332,171 | 7/1994 | Steff ............................ 242/378 |

FOREIGN PATENT DOCUMENTS

| | | |
|---|---|---|
| 0063313 | 10/1982 | European Pat. Off. . |
| 2549308 | 1/1985 | France . |
| 3518157 | 11/1986 | Germany . |

OTHER PUBLICATIONS

IBM Technical Disclosure Bulletin, W. Dollenmayer, "Cable Storage Reel" vol. 6, No. 7, p. 69, Dec. 1963.

Drawing of Morey Cord Reel, The Morey Corporation, Downers Grove, Illinois.

Drawing of Tamra Cord Reel, Tamra Electric Works, Ltd., Japan.

Primary Examiner—John P. Darling
Attorney, Agent, or Firm—Arnold, White & Durkee

[57] ABSTRACT

A cord reel assembly is provided which maintains a length of stationary wire and a length of shielded retractable wire around a spool. The assembly dispenses the retractable wire as an attached handset is extended away from the assembly, while the stationary wire is concurrently being wound. A portion of the stationary wire internal to a housing enclosure is unshielded, while a portion extending outside the housing enclosure is shielded. The unshielded stationary wire is shielded by applying conductive paint or electroplating to the housing enclosure, thereby reducing EMI emissions. A spring cover retains a recoil spring and provides a bearing surface against a spindle member. The winding direction of the stationary and retractable wires is chosen, and the stationary wire conductors are arranged with shield ground wires, such that EMI emissions are reduced.

16 Claims, 6 Drawing Sheets

CORD REEL ASSEMBLY

FIELD OF THE INVENTION

The present invention relates to an apparatus for dispensing wire, and, more particularly, to a cord reel assembly.

BACKGROUND OF THE INVENTION

A cord reel stores a length of wire in a convenient small housing unit until the wire is needed, at which time a user can pull out the length of wire required by the situation. When the user no longer needs the wire, a spring inside the cord reel retracts the length of wire back into the housing.

One conventional application of a cord reel is a mechanic's "drop light." Drop lights were often found in auto repair shops hanging from the ceiling just above head height. When a light was needed, a mechanic would grab the drop light and pull the desired amount of electrical cord from the cord reel (attached to the shop ceiling). When the mechanic no longer need the light, the cord reel would retract the cord. This eliminated the need for many loose wires and extension cords lying on the shop floor which could get tangled or damaged.

The earlier developed cord reels were typically limited to electrical power applications since they relied on electrical brushes and slip rings to achieve electrical continuity between the stationary cord reel housing and rotating cord reel spool. Brushes typically cause short interruptions in continuity due to their sliding nature, which does not usually affect most simple electrical devices as lights and motors,- but have a severe detrimental effect on precise equipment such as communication devices. In analog devices, these interruptions appear as noise or static. In digital devices, these interruptions will cause loss of bits of information, which could at times cause data transmission to be incomplete or lost, or worse yet, incorrect.

It was not until the development of the brushless cord reels (e.g., reels which do not use brushes and slip rings) that cord reels became widely used for communication purposes. Instead of brushes, these cord reels have a "stationary" cord bridging the spool and housing, providing uninterrupted, continuous contact throughout cord reel operation. While the usable portion of the cord is extended and retracted, the stationary cord is allowed to coil and uncoil between the rotating spool and stationary housing.

SUMMARY OF THE INVENTION

An assembly comprises a storage unit, tension means coupled to the storage unit, a housing enclosing the storage unit and the tension means, and a spindle member removably positioned within the storage unit. The storage unit stores a stationary coil and a movable coil and is operable to wind the stationary coil as the movable coil is dispensed. The tension means resists dispension of the movable coil.

DETAILED DESCRIPTION OF THE PREFERRED EMBODIMENTS

Figure 1A:
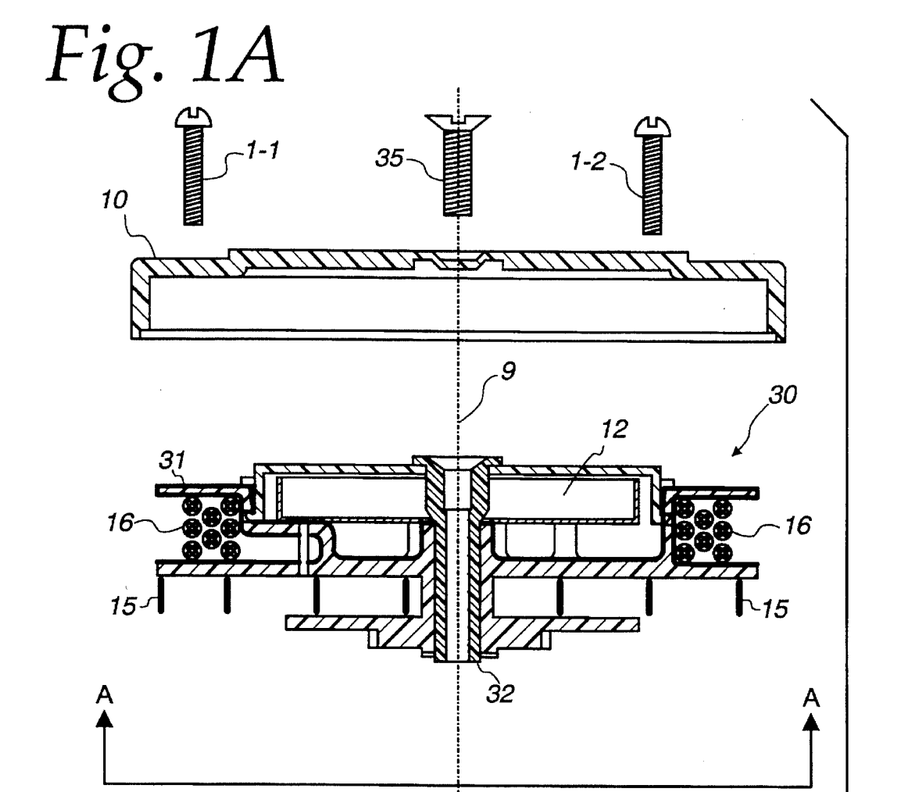
FIGS. 1A and 1B are exploded, cross-sectional views of an upper and lower segment, respectively, of the cord reel assembly in accordance with the present invention.
Figure 1B:
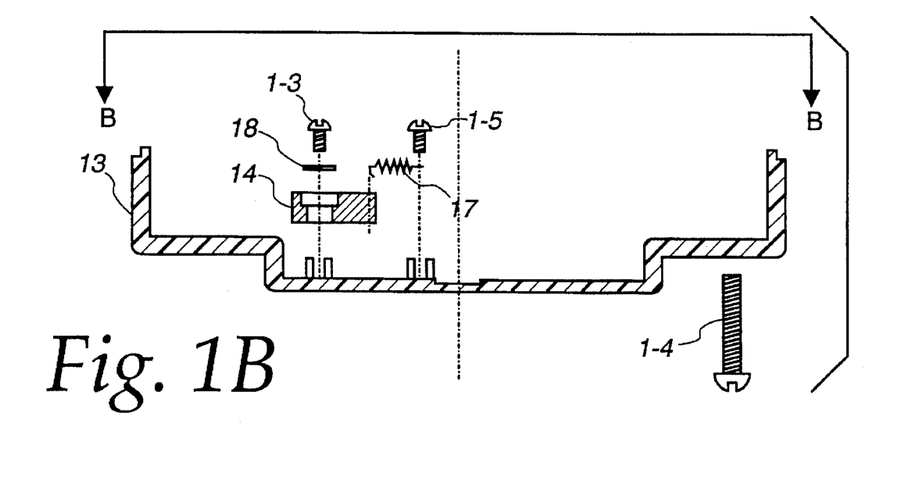
Figure 2A:
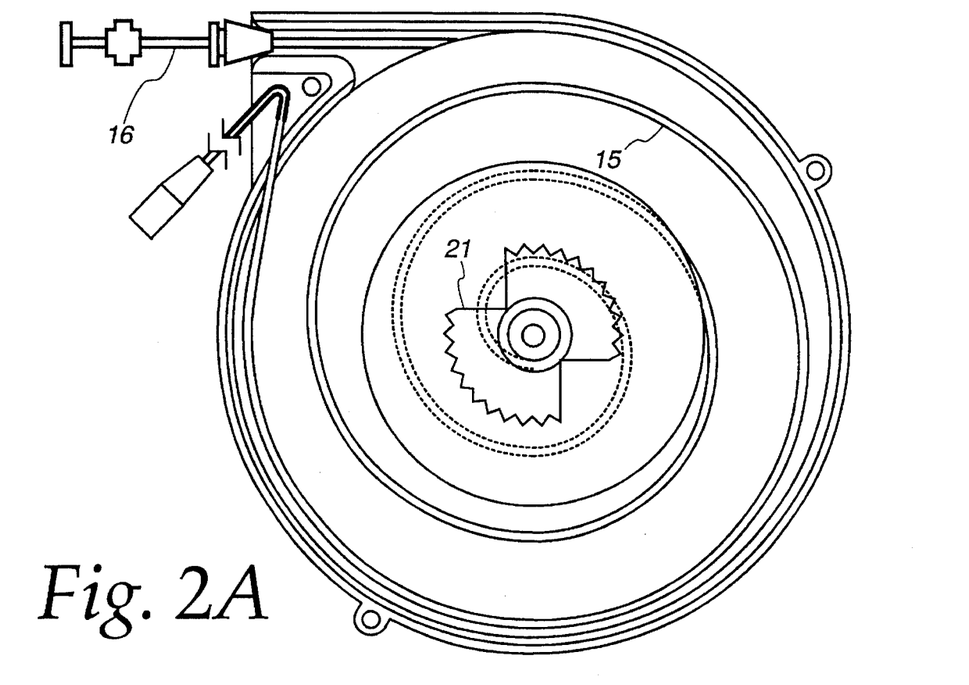
FIGS. 2A and 2B represent upper perspective views along lines A—A and B—B, respectively, from FIGS. 1A and 1B.

FIG. 1A shows an exploded view of an upper segment of a cord reel assembly in accordance with the present invention. An upper view of the upper segment along perspective lines A—A is shown in FIG. 2A. FIG. 1B shows an exploded view of a lower segment of the cord reel assembly in accordance with the present invention. The upper and lower segments, which are coaxially aligned along line 9, are securably engaged to form a single integrated cord reel assembly unit. Similar numeral references among the drawings reflect the same component or subsystem.

The assembly portion shown in FIG. 1A includes a housing 10 and spool assembly 30 containing a spring unit 12. The spool assembly further includes a spool structure maintaining a first wire coil segment 15 around an upper spool hub and a second wire coil segment 16 around a lower spool hub. The assembly portion shown in FIG. 1B includes a housing cover 13, pawl 14, and spring 17. Coil segment 15 is preferably an 8-conductor flat (stationary) wire and coil segment 16 is preferably a round 4-conductor shielded (retractable) wire. Alternatively, the coil segments 15 and 16 may be modified to include a different number of conductors.

Figure 3:
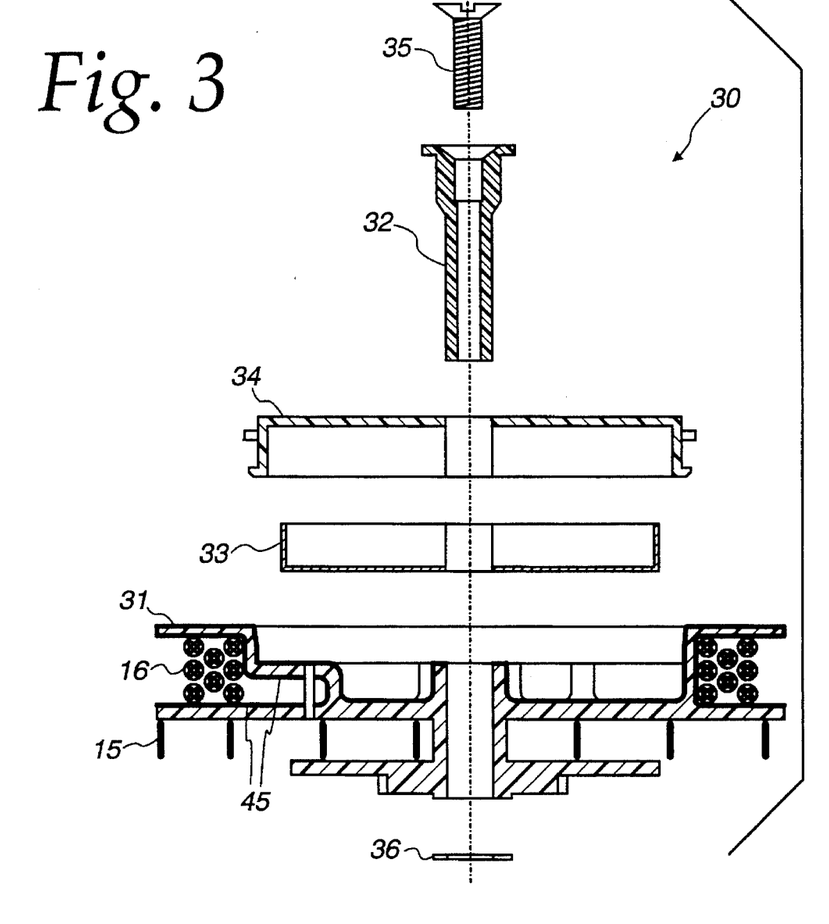
FIG. 3 is an exploded, cross-sectional view of the spool assembly shown in FIG. 1A.

The assembly portions are mated together according to the following installation procedure, with references being made to both FIGS. 1A and FIG. 3 (discussed infra). Spool structure 31 sits on spindle 32, and rotates in housing 10. Spindle 32 is securably fastened to housing 10 by sitting in a double "D" slot and secured by screw 35. A spring within the spring unit 12 is indirectly attached at one end to spool 31, and directly attached to the spindle 32 at the other end. Rotating either the spool 31 or the spindle 32 prewinds (pretensions) the spring.

After the pawl 14 is secured into the lower assembly segment using washer 18 and screw 1-3, the housing cover 13 is secured to the installed spool assembly as follows. The spool structure 31 within the spool assembly 30 is installed on the spindle, and the spindle is preferably rotated approximately 2 to 2½ turns to prewind the spring. After the spring is prewound, the first coil segment (flat stationary wire 15) stored on the upper hub of the spool structure is then wound (coiled), preferably so that the first coil segment 15 makes approximately 4¼ turns when the coil of round retractable wire 16 is fully retracted within the cord reel assembly. The cover 13 containing pawl 14 and spring 17 is then installed over the spool and fastened to housing 10 by screws 1-1,1-2, and 1-4.

Figure 2B:
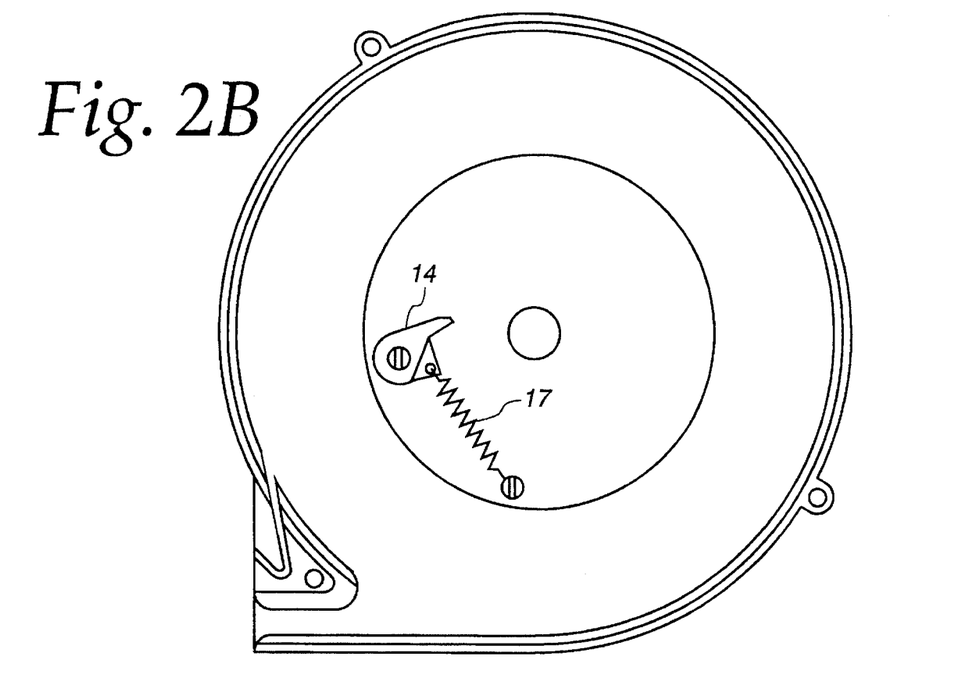

FIG. 2A shows the first wire coil segment 15 wound within the cord reel assembly when the round retractable wire 16 is in the fully retracted position. FIG. 2B shows one end of spring 17 attached to pawl 14 acting to create a tension force pulling the pawl 14. When the segments shown in FIGS. 2A and 2B are integrated according to the installation procedure outlined above, the arm of pawl 14 will engage with the teeth of integral ratchet 21.

FIG. 3 is an exploded view of the spool assembly in FIG. 1A. The spool assembly 30 includes spool 31, spindle 32, spring cage 33 enclosing a spring element, and spring cover 34. The spool 31 includes an upper hub for storing first wire coil segment 15 and a lower hub for storing second wire coil segment 16. The spool assembly is configured as follows. Spindle 32 is secured to housing 10 by screw 35. Spool 30 is placed over spindle 32, and washer 36 is then placed on the end of spindle 32. Cover 13 (see FIG. 1B) is placed over the spool and spindle, and then fastened to housing 10, thereby enclosing the spool assembly 30 and washer 36.

Figure 4:
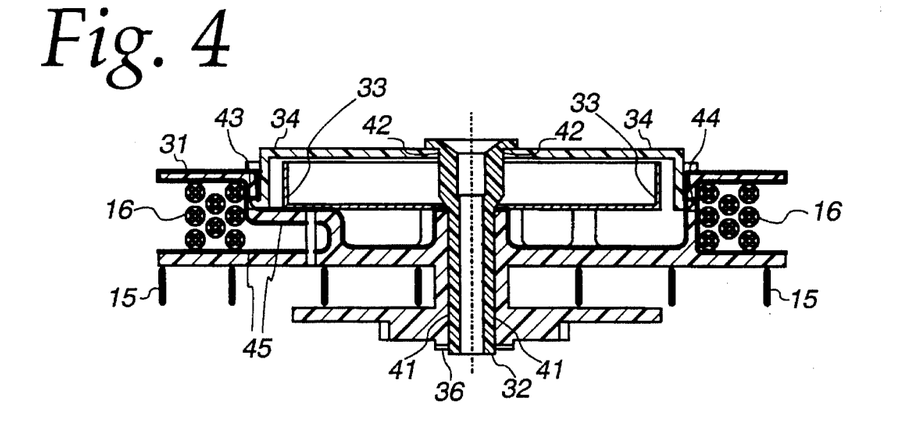
FIG. 4 is an enlarged, cross-sectional view of the spool assembly, as integrated, in FIG. 3.

FIG. 4 is an enlarged section view of the spool unit 30 in FIG. 3, as assembled. Referring specifically to spindle 32, conventional cord reels experience a degree of friction due to the minimal bearing support that is very short and located at only one end. However, in accordance with the present invention, spindle 32 offers two bearing surfaces 41 and 42, thereby improving spool stability, distributing bearing loads, reducing wear and friction, and producing a smoother, consistent rotating action. Friction is further reduced by minimizing the bearing diameter. Since friction is a constant parameter of operation, rotational friction is reduced by minimizing the radius at which the friction forces act.

Conventional cord reel assemblies, in particular, exhibit spool problems relating to load, friction, wear, and a tendency to "tip and bind" since there is only one bearing surface. Specifically, in these conventional units, the recoil spring (which engages the spindle) forces the bearing surface to either be entirely above or below the spring. However, spindle 32 according to the present invention supports the spool 31 both above and below the spring enclosed within spring cage 33. The bearing support of spool 31 beneath the recoil spring is accomplished by the spring cover 34 which snaps into the spool at slots 43 and 44, and provides bearing surfaces on both sides of the spool. Accordingly, the spindle supports the spool at the upper hub and the spring cover 34.

The spindle 32 is a removable element preferably molded from a bearing grade plastic such as Delrin. In conventional cord reel assemblies, the spindle is molded as part of the cord reel housing. In such molded-in assemblies, complex masking of the bearing surfaces must occur if EMI coatings are necessary since these surfaces must not be coated. Prior art masking leaves an undesirable "EMI hole" corresponding to a hole in the EMI coating through which EMI emissions may exit. Advantageously, spindle 32 according to the present invention is secured to the cord reel housing after application of the EMI coating (discussed infra), thereby eliminating the need for masking and avoiding any resultant "EMI hole".

The removable spindle also improves assembly of the cord reel. The recoil spring functions to engage the spindle, thus holding the entire rotational force of the cord reel. The cord reel of the present invention is pretensioned by rotating the spindle of the as-assembled unit. Specifically, a user simply inserts a hex key into the exposed hex slot of the spindle, and turns the spindle the required number of turns and then tightens the spindle screw, thus locking the spindle in place.

Spring cover 34 retains the recoil spring within spring cage 33, and provides bearing support at surfaces 42 as noted above. The recoil spring is directly attached at one end to spindle 32, and is indirectly attached at the other end to the spool by means of attachment to the spring cage 33 which in turn is connected to spool 31. During assembly of the cord reel, the spring is preferably pretensioned approximately two turns. Since on most cord reels the spindle is a fixed molded part of the housing, the only way to pretension the spring is to either rotate the spool in the housing several turns, or manually coil the spring with pliers or other tools and hook it to the spindle while under tension. Turning the spool is cumbersome since both stationary and useable cords with connectors are already preassembled to it. During pretensioning of the spring, these cords must be held out of the way to prevent them from being entangled with each other or other cord reel components. Manually pretensioning the spring with a tool is even more difficult and dangerous because a tensioned spring has a tendency to pop up and out of its housing, potentially injuring an assembler.

As noted above, the removable spindle of the present invention has a hex socket molded into one end allowing an assembler to insert a hex key and turn the spindle to pretension the spring. Once the spring is properly pretensioned, the spindle mounting screw is tightened, locking the spindle in place. This simple method greatly improves assembly time, ease, and safety.

Since the inside of the cord reel housing must be coated with EMI paint, cord reels which have the spindle molded as part of the housing require masking to prevent painting of the bearing surfaces. This not only requires additional labor, but the unpainted spindle leaves an "EMI hole," that is the spindle area of the cord reel housing is not shielded and therefore allows free emission of EMI. The removable spindle allows easy painting of the entire inside surface of the cord reel housing, requiring no masking of the spindle area and leaving no EMI hole. The spindle is installed after painting during the assembly process.

As noted above, the cord reel assembly of the present invention incorporates a spring cover 34 which snaps into spool 31 to enclose and completely contain the recoil spring within the rotating spool, thus providing additional spool bearing support to improve spool rotation. By completely containing the recoil spring within the rotating spool, the spring cover 34 avoids rotational friction found in the prior art since both sides of the recoil spring contact the rotating spool.

In particular, a tensioned spring has a natural tendency to expand out of its normal coiled plane. This tendency increases as spring tension is increased. In conventional cord reels, the spring is trapped between the stationary housing and rotating spool so that when the spring is tensioned, it tends to rub against surfaces which do not move together, resulting in additional friction and wear. However, since the spring is attached at one end to the spindle and at the other end to the spring cover which itself becomes part of and rotates with the spool (when snapped into the spool), friction and wear is minimized.

Figure 5:
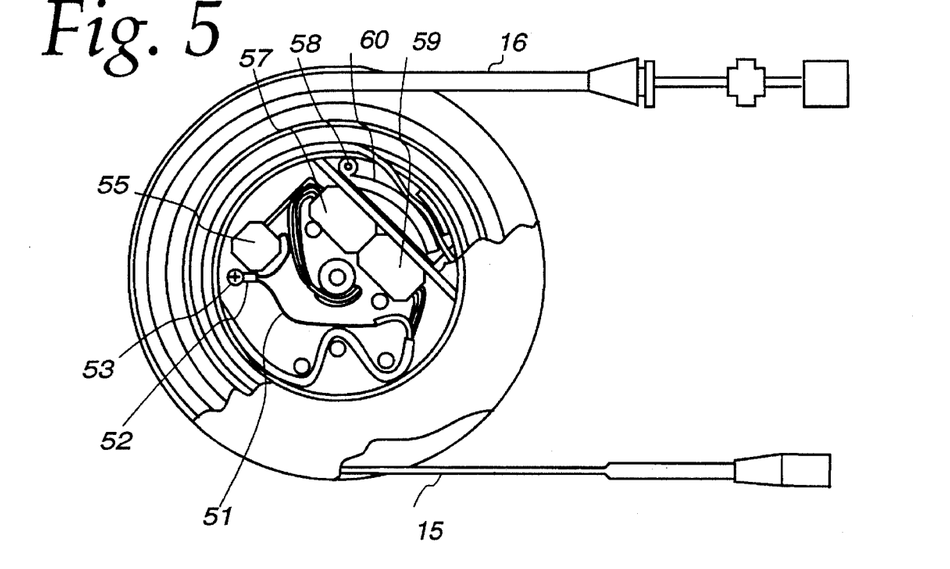
FIG. 5 is an upper-plan diagram of the interior components enclosed within the lower segment of the cord reel assembly.
Figure 6:
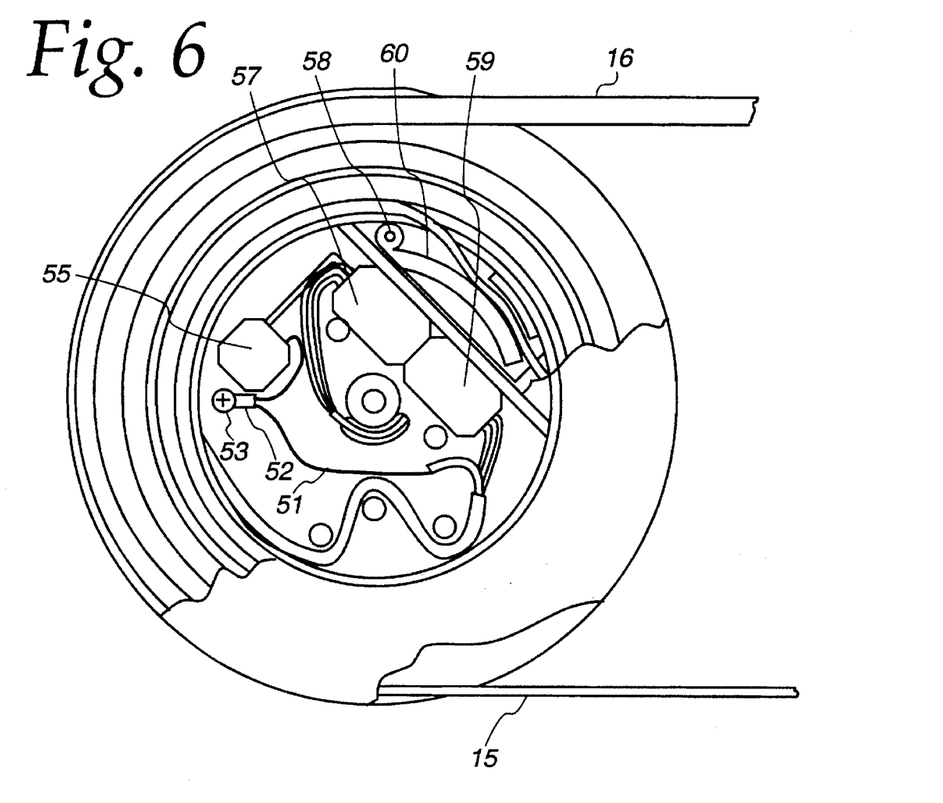
FIG. 6 is an enlarged view of the FIG. 5 diagram.

FIG. 5 is an upper plan view of the wiring configuration within the cord reel assembly of the present invention. Reference should likewise be made to FIG. 6 representing an enlarged view of the interior wiring configuration. A first coil segment 15 is wound within the cord reel assembly and serves as the stationary coil. Preferably, coil segment 15 is a flat wire ribbon cable element (discussed infra). A second coil segment 16 serves as the useable cord which may be extended from the cord reel assembly and then retracted for wound storage within the cord reel assembly.

The wiring configuration includes a bus wire 51, capacitor 55 with one bare leg crimped with bus wire 51 into ring terminal 52, ring terminal 52 fastened to the spool 31 with screw 53, and male and female connectors 59 and 57. The spool 31 preferably has a conductive EMI coating to reduce emissions between coils 15 and 16. The coating is grounded by terminal 52 and screw 53.

The EMI emissions from the stationary wire are controlled using a unique conductor arrangement in the stationary wire and selecting an optimal coil direction for the wire.

As noted above, the cord reel assembly of the present invention includes a coil arrangement using a flat stationary cord connected inside the spool 31 to a round useable cord extending out of the cord reel to a handset. The flat stationary cord is preferably a cord having eight 28-gage conductors manufactured by W.L. Gore & Associates, Inc. In the preferred implementation, four of the eight conductors are used for signal transmission, and these four communication conductors are arranged in pairs which carry similar signals in opposite directions. The remaining four conductors are dedicated to shield grounds. The ground and signal conductor arrangement is as follows:

SHIELD GROUND
SIGNAL A OUT
SIGNAL A RETURN
SHIELD GROUND
SHIELD GROUND
SIGNAL B OUT
SIGNAL B RETURN
SHIELD GROUND

The advantage of having multiple wires dedicated to shield ground is to reduce resistance and improve EMI characteristics, and to permit selective pairing and separation of communication conductors.

Figure 2C:
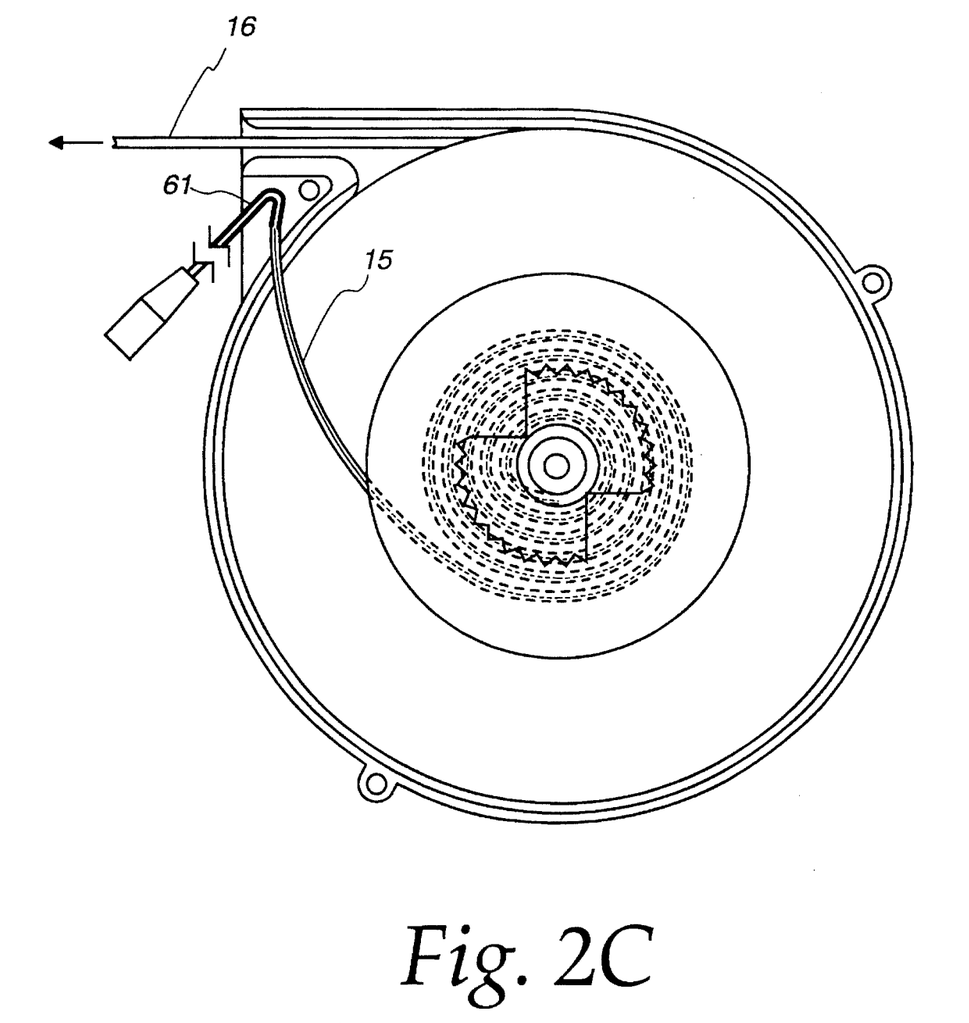
FIG. 2C is a view similar to FIG. 2A, but showing a first wire coil segment in a tightened state when a second wire coil segment is extended from the cord reel housing.

The winding of the stationary (flat) wire is undertaken so that the flat wire is a loose coil when the useable cord is fully retracted (FIG. 2A) and is a tight coil when the useable cord is at full extension (FIG. 2C). This particular orientation of the coil winding permits the natural spring tendencies of the coiled stationary wire to assist, rather than oppose, the recoil spring in the retraction motion of the cord reel.

The natural state of a flat wire is generally straight. Coiling a wire requires application of a force and the wire stores energy like a spring. In cord reel assemblies where the coil directions are opposite for the stationary and useable cord, the recoil spring must not only coil the useable cord but also must coil the stationary cord. However, in the present invention, the reverse coil direction allows the stationary wire to be closer to its free state when retracted.

Extending the cord causes energy to be stored in both the spring and stationary cord as they wind tighter on the hub. As the cord retracts, both the stationary cord and the recoil spring move toward their free state and unwind. Since they work together, the recoil spring can be smaller and lighter since it does not work as hard. This also results in lower loads and less wear in the cord reel.

A coil direction of the stationary cord such that it is tight on the hub at full extension and tight against the outside wall at full retraction causes the coil direction to be the same for both the stationary and useable cord. Though this may cause magnetic fields to add, it also causes the total number of cord coils in the cord reel to remain constant throughout extension. As the cord is extended, the stationary wire winds tighter on the hub such that for every spool revolution, one coil of useable wire is extended outside of the housing, while one coil of stationary wire is gained.

Element 60 in FIG. 5 is a cord stop pivotably attached to a peripheral edge of spool 31 which rotates out and mechanically stops spool rotation when the extended round cord nears its limit. A front portion of the cord stop physically abuts against the cord exit. The cord stop also prevents excessive flexing of the useable (round) wire 16 at the point it goes through the spool into the hub area. The excessive flexing that would occur if the stop were not present would cause premature failure of the shield and conductors in the cord.

The cord reel assembly of the present invention uses a modified, integral cord guide molded as part of the cord reel housing, thus eliminating the need for a separate part. In addition, the integral cord guide allows more of the inside of the cord reel to be coated with EMI paint (discussed infra), hence minimizing the EMI hole at the useable cord exit and improving the EMI shielding to reduce emissions.

The cord reel assembly incorporates an interlocking feature on the housing halves. This interlocking feature is a small lip on one part and a small recess on the mating part to create male and female parts that interlock when assembled. The mechanism also improves shielding because it prevents any small slot from developing along the mating surfaces of less than perfect parts. The mechanism blocks EMI emissions along the mating surfaces.

An advantageous feature of the cord reel assembly according to the present invention is the reduction in EMI emissions. A significant obstacle in making a cord reel of the type disclosed herein (e.g., brushless and providing uninterrupted continuity) is that flexing of wires inside the cord reel is not compatible with shielded wires. Shielded wires are susceptible to flex fatigue, i.e. continuous flexing during use causes the shield, conductors and/or insulation to break down.

The cord reel assembly of the present invention uses shielded wire only on the portion of wire that extends outside the cord reel. Internal to the cord reel assembly is a portion of the flat stationary wire that is not shielded and therefore not susceptible to flex fatigue. Shielding for this wire is accomplished by shielding the housing of the cord reel, or by applying conductive paint or electroplating to the housing. In addition, conductive paint or plating is applied to the spool to further reduce EMI emissions as they radiate from the coiled wire inside the cord reel assembly. With respect to the spool, the conductive paint or plating is preferably applied to the lower hub so as to prevent signal interference between the first coil segment 15 and the second coil segment 16. This conductive paint or plating is designated by the reference numeral 45 in FIG. 4. As an alternative to using paint or plating for providing shielding, the spool and housing covers may be fabricated from conductive plastics or metals.

Figure 7:
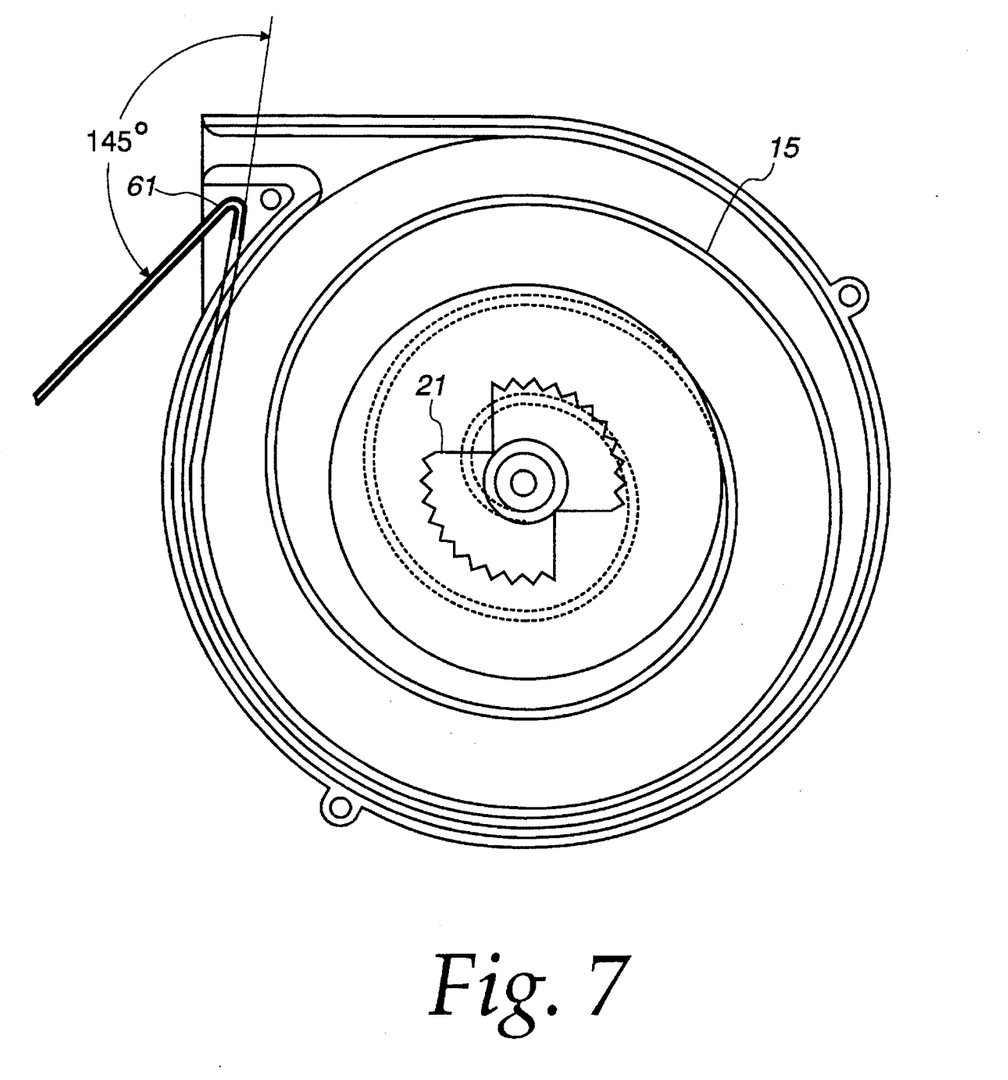
FIG. 7 represents a view of the cord reel housing and stationary cord exit for the assembled cord reel unit.

FIG. 7 shows housing 10 and a portion of stationary flat wire 15 to illustrate how the stationary wire is routed out of the cord reel assembly. Since EMI coating is applied to the interior of the cord reel housing, but not to the flat wire used as the stationary cord inside the cord reel, a shield must be added to that part of it which extends out of the shielded (EMI-painted) cord reel housing. In addition, the hole from which the cord exits must be designed to minimize EMI leakage from inside the housing.

The stationary cord is routed out of the cord reel housing via a hook-shaped path 61 which develops a sharp bend at the exit. A sufficient portion of the flat wire is accessible at the exit in a transition area to allow shielding which partially fits into the hook-shaped path 61, thereby blocking stray EMI from leaking out of the housing as well as providing shield ground to the EMI paint on the inside of the housing. The sharp bend in the exit path 61 favors strain relief of the stationary cord so that accidental pulling of the stationary wire outside the cord reel does not affect the cord inside the housing. The cord exit therefore serves to promote EMI blocking and strain relief, and functions as a shield transition area and shield ground of the EMI paint.

While there has been shown and described herein what are presently considered the preferred embodiments of the present invention, it will be obvious to those skilled in the art that various changes and modifications can be made therein without departing from the scope of the present invention as defined by the appended claims.

What is claimed is:

1. A cord reel assembly, comprising:

a housing;

a storage unit disposed within said housing and supporting a stationary coil and a movable coil, said stationary coil including a plurality of signal conductors organized into conductor pairs carrying similar signals in opposite directions and a plurality of ground conductors, at least one of said plurality of ground conductors separating said conductor pairs; and a tension element disposed within saint housing and coupled to said storage unit, said tension clement resisting dispension of said movable coil from said housing.

2. A cord reel assembly, comprising:

a storage unit for storing a stationary coil and a movable coil;

a tension element coupled to said storage unit for resisting dispension of said movable coil; and a housing enclosing said storage unit and said tension means, said housing including a hook-shaped exit allowing a first shielded wire coil segment of said stationary coil to extend from within said exit to outside said housing and a second unshielded wire coil segment of said stationary coil to be enclosed within said exit.

3. A cord reel assembly, comprising:

a housing;

a storage unit disposed within said housing and supporting a stationary coil and a movable coil, said storage unit including a spool and a spindle removably positioned within said spool, said spindle being detachably mounted to said housing, said housing forming a first EMI shield positioned to minimize EMI emissions from the cord reel assembly, said spool forming a second EMI shield positioned to minimize signal interference between said stationary coil and said movable coil; and a tension element including a recoil spring distinct from said stationary coil, said tension element being disposed within said housing and coupled to said storage unit, said tension element resisting dispension of said movable coil from said housing.

4. The assembly as recited in claim 3 wherein said storage unit forms a first hub for maintaining said stationary coil and a second hub for maintaining said movable coil.

5. The assembly as recited in claim 4 wherein said stationary coil is tight around said first hub when said movable coil is fully dispensed from said housing and is tight against an inner wall of said housing when said movable coil is fully retracted into said housing.

6. The assembly as recited in claim 4 wherein said second EMI shield is positioned at said second hub of said spool.

7. The assembly as recited in claim 3 wherein said second EMI shield includes a layer of conductive paint on a surface of said spool.

8. The assembly as recited in claim 3 wherein said second EMI shield includes electroplating on a surface of said spool.

9. The assembly as recited in claim 3 wherein said storage unit is operable to tighten said stationary coil as said movable coil is dispensed from said housing and to loosen said stationary coil as said movable coil is retracted into said housing.

10. The assembly as recited in claim 19 wherein said first EMI shield includes a layer of conductive paint on a surface thereof.

11. The assembly as recited in claim 3 wherein said first EMI shield includes electroplating on a surface thereof.

12. The assembly as recited in claim 3 wherein said housing is fabricated from a conductive material selected from a group consisting of conductive plastic and conductive metal.

13. The assembly as recited in claim 3 wherein said spool is fabricated from a conductive material selected from a group consisting of conductive plastic and conductive metal.

14. A cord reel assembly, comprising:

a housing;

a storage unit disposed within said housing and supporting a stationary coil and a movable coil, said storage unit including a spool and a spindle removably positioned within said spool, said spindle being detachably mounted to said housing; and a tension element disposed within said housing and coupled to said storage unit, said tension element resisting dispension of said movable coil from said housing, said tension element including a recoil spring in tension communication with said movable coil, said recoil spring and said spindle being constructed and arranged such that said recoil spring is pretensioned in response to rotating said spindle a predetermined number of turns relative to said storage unit and locking said spindle to said housing.

15. The assembly as recited in claim 14 wherein said spindle includes a socket for receiving a key for rotating said spindle, and said spindle includes a mounting element for locking said spindle to said housing.

16. A method of manufacturing a cord reel assembly, comprising the steps of:

fabricating a housing with a first EMI shield for minimizing EMI emissions from the cord reel assembly;

fabricating a storage unit for supporting a stationary coil and a movable coil, the storage unit including a spool and a spindle removably positioned within the spool, the spool forming a second EMI shield positioned to minimize signal interference between the stationary coil and the movable coil;

after fabricating the housing with the first EMI shield, connecting the spindle of the storage unit to the housing; and positioning a tension element within the housing and coupling the tension element to the storage unit such that the tension element resists dispension of the movable coil from the housing, the tension element including a recoil spring distinct from the stationary coil.

* * * * *